Patented Mar. 26, 1935

1,996,021

UNITED STATES PATENT OFFICE 1,996,021

MINERAL CONCENTRATION

Simon Klosky, Roselle, N. J., assignor to The American Agricultural Chemical Company, Newark, N. J., a corporation of Delaware No Drawing. Application September 21, 1931, Serial No. 564,252. Renewed August 18, 1934

12 Claims. (Cl. 209—166)

This invention relates to mineral concentration, and more particularly to the concentration of phosphate-bearing materials. Such materials include, for example, ores of the nature of apatite, found in Florida, and phosphorite, and likewise mixtures which comprise sand or the like silicious material and tri-calcium phosphate or other insoluble phosphates and which are of natural occurrence or may be artificially prepared by mixing or by precipitation and other chemical processes.

In the concentration of ores and the like, such as in the separation of minerals from gangue, which is chiefly silica, by "wetting" one constituent and not the other, an important aspect is the finding of an agent to effect such wetting suitably for the particular mineral, or class of ores or minerals involved. Where sulfides are to be separated from gangue, this problem is relatively easy. For example, in the case of silver, copper, or even zinc ores a small amount of valuable material is separated from a large amount of gangue, the amount of concentrating agent required being relatively small, so that its cost, if not inordinately excessive, is not important. In concentrating phosphate rock and like materials, conditions are materially different in the respects mentioned, and a satisfactory concentrating agent must be relatively inexpensive.

Accordingly, as the present invention notably includes among other objects hereinafter apparent or incidental to its practice, both economy and efficiency in mineral concentration, an important feature of the invention is directed to the provision and use of an inexpensive and thoroughly satisfactory concentrating agent for phosphate separation. Such new concentrating agent comprises the material known as bone-oil, a composition commonly produced as a by-product in the manufacture of bone black by distillation from bones.

In its original, or what may be conveniently styled, "crude" form, as produced for example in the manner stated, this material may be used with satisfactory results as a "wetting" or concentrating agent for separating phosphatic minerals. It has further been found, however, that the beneficial characteristics of a concentrating agent of the nature of bone-oil are considerably improved by the use of a suitable treating reagent, conveniently a base of inorganic nature. Among such reagents, materials conveniently classed as "alkalis" including sodium hydroxide, potassium, hydroxide, sodium carbonate, lime (CaO) and including as well, substances of the nature of lead oxide (PbO), may be used, satisfactory results being obtained, for example, by treating bone-oil with about 1% of its weight of such alkali. This treatment, which may desirably be performed preliminary to further use of the bone-oil in a concentration process, produces a so-called "treated" product, having marked advantages for the purpose indicated; the reaction, which generally effects a physical thickening of the bone-oil, is believed to be of the nature of a partial hydrolysis and/or a polymerization of that material, rather than a saponification or the like.

Application of the bone-oil, in the crude or the treated form, directly to the phosphate material for separation purposes affords a satisfactory resulting phosphatic concentrate; it has, however, also been found that a desirably improved action may be had by the use of a material of the nature of a basic soluble sulfide, for cooperation with the ore or the like in the concentration process. This feature of the invention may be conveniently carried out, for example, as an early step in the process, by treating the phosphatic pulp with a solution of the sulfide which may have a strength, say of 1%. As such "conditioner" sodium sulfide is desirably effective, and as examples of other basic soluble sulfides, suitable for the purpose, there may be noted sulfides of potassium, ammonium, barium and the like. This conditioning treatment greatly facilitates the separation of such material from silica and the like, in that the concentrating agent is enabled to exert a more specific action on the phosphate so as to increase substantially, in the resulting concentrate, the percentage of product desired,—which may be, for example, bone phosphate of lime (commonly abbreviated "B. P. L.").

It may be here pointed out that such use of a basic soluble sulfide as a conditioner is unrelated to the step in some flotation processes and the like by which oxide ores are sulfurized for conversion to sulfides before flotation; on the other hand, the action in the present case involves merely an alteration of the surface of the phosphate, to render the action of the concentrating agent more specific. A relatively small amount of sulfide conditioner may conveniently be used, and it is believed that there is no substantial conversion of anything into sulfide, the eventually resulting concentrate being phosphate rather than sulfide material. It may also be noted that the use of a conditioner of the character described is of peculiar advantage for purposes of economy; it has been found, for example, that the amount of bone-oil required to concentrate a given quantity of phosphate ore or the like is materially reduced by effecting treatment with such a conditioner, and that likewise the recovery of phosphate may be substantially increased by the conditioning treatment.

For concentrating phosphate materials prepared, for example, as a pulp or in equivalent form of desired fineness, the separation step of the invention may be performed in any suitable concentration apparatus; any concentrating table, such for instance as the Wilfley type, may advantageously be used, or a standard flotation cell, with or without aeration, may be employed. A suitable Wilfley table is shown, for example, in R. H. Richards and C. E. Locke, "Text Book of Ore Dressing" (McGraw-Hill Book C., New York, 1925), at pages 207–213.

In carrying out the process, any suitable oil may be used in conjunction with bone-oil to effect a satisfactory concentration, such cooperating oils including, for instance, fuel oil, distillate, lubricating oil, kerosene, and the like. The use of a small amount of pine oil is also beneficial, although not essential. It has further been found that the use of sodium silicate in combination with bone-oil is advantageous to further the desired separation.

As will now be understood, the invention is suitable for the concentration of any phosphatic pulp. Desirable results being had, for instance, with Florida phosphate, which contains approximately 50% B. P. L., data obtained in the treatment of such material is here used for purpose of illustration; it being also understood that any process capable of turning out a product containing over about 68% B. P. L. is commercially practicable.

In the following specific examples, which may serve to illustrate some of the features of the invention, in a manner clear to those skilled in the art, reference throughout is to parts by weight unless otherwise specified.

Example I 650 parts of phosphate rock débris of 20-mesh fineness were mixed with 10 parts of treated bone-oil, 5 parts of kerosene, and 3 parts of pine oil, together with enough water to wet the mass. The latter was then tabled, and yielded a concentrate which tested 72.9% B. P. L. and comprised a recovery of 86% of the original phosphate.

Example II 587 parts of the same rock were treated with one part of sodium sulfide in 100 parts of water, and to the mixture were added 3 parts of treated bone-oil, 2 parts of fuel oil, and one part of pine oil. The mass was tabled and 96.6% of the phosphate recovered in the concentrate, the latter containing 73.7% B. P. L.

Example III 567 parts of rock were treated in the same manner with sodium sulfide, and 3 parts of treated bone-oil, 3 parts of fuel oil, and one part of sodium silicate (40° Bé.) were added. The mass was tabled and yielded 94% of the phosphate as a concentrate containing 71.5% B. P. L.

Example IV 300 parts of the 20-mesh débris were mixed with one part of crude bone-oil, 5 parts of kerosene, and one part of pine oil. After the material has been well mixed, 10 parts of (5%) sodium silicate were added, and the mass was fed to a flotation cell. A small amount of float taken analyzed 65.5% B. P. L.

Example V 300 parts of the same material were mixed in the same manner as set forth in Example IV, except that one part of treated bone-oil was used in lieu of the crude agent. Two concentrates were collected, averaging 74.5% B. P. L. content and representing 57.6% recovery of the phosphate present.

It is to be understood that the invention is not limited to the specific compositions and procedure herein described but can be carried out in other ways without departure from its spirit as defined by the following claims.

I claim:

1. In the art of concentrating phosphatic material in the form of a pulp to separate phosphatic from other constituents, the improvement which comprises mixing the phosphatic pulp with a conditioner and with bone-oil as a concentrating agent, and thereafter subjecting the mixture to the concentrating operation and recovering a phosphate-bearing concentrate.

2. In the art of concentrating phosphatic material in the form of a pulp to separate phosphatic from other constituents, the improvement which comprises mixing the phosphatic pulp with a conditioner and with a concentrating agent comprising bone-oil which has been treated with a small amount of an alkali, and thereafter subjecting the mixture to the concentrating operation and recovering a phosphate-bearing concentrate.

3. In the art of concentrating phosphatic material in the form of a pulp to separate phosphatic from other constituents, the improvement which comprises mixing the phosphatic pulp with a concentrating agent comprising bone-oil which has been treated with a small amount of an alkali, and with the petroleum oil, and thereafter subjecting the mixture to the concentrating operation and recovering a phosphate-bearing concentrate.

4. The process of concentrating phosphatic material, which comprises mixing phosphatic pulp with a basic soluble sulfide and with bone-oil as a concentrating agent, subjecting the mass to concentration operation, and thereby effecting separation of a phosphate-bearing concentrate.

5. In the art of concentrating phosphatic material in the form of a pulp to separate phosphatic from other constituents, the improvement which comprises mixing the phosphatic pulp with bone-oil as a concentrating agent, and thereafter subjecting the mixture to the concentrating operation and recovering a phosphate-bearing concentrate.

6. The process of concentrating phosphatic material, which comprises treating a phosphate pulp with a basic soluble sulfide, in amount not substantially more than one percent of the weight of pulp, and then with a concentrating agent comprising bone-oil which has been treated with a small amount of an alkali, and with a petroleum oil, the amount of said treated bone-oil and said petroleum oil each being not substantially more than one per cent of the weight of pulp, subjecting the treated pulp to concentration operation, and thereby effecting separation of a phosphate-bearing concentrate.

7. In a process of concentrating phosphatic material in which a phosphate-bearing concentrate is recovered by concentrating operation to separate phosphatic from other constituents, the step of mixing the phosphatic pulp with bone-oil as a concentrating agent.

8. In a process of concentrating phosphatic material in which a phosphate-bearing concentrate is recovered by concentrating operation to separate phosphatic from other constituents, the step of mixing the phosphatic pulp with a concentrating agent comprising bone-oil which has been treated with a small amount of an alkali.

9. In a process of concentrating phosphatic material in which a phosphate-bearing concentrate is recovered by concentrating operation to separate phosphatic from other constituents, the steps of treating bone-oil with a small amount of an alkali, and mixing the phosphatic pulp with the treated bone-oil as a concentrating agent.

10. In a process of concentrating phosphatic material in which a phosphate-bearing concentrate is recovered by concentrating operation to separate phosphatic from other constituents, the steps comprising treating the phosphatic pulp with a basic soluble sulfide, and mixing the treated pulp with bone-oil as a concentrating agent.

11. In a process of concentrating phosphatic material in which a phosphate-bearing concentrate is recovered by concentrating operation to separate phosphatic from other constituents, the steps comprising treating the phosphatic pulp with a basic soluble sulfide, and mixing the the treated pulp with a concentrating agent comprising bone-oil which has been treated with a small amount of an alkali.

12. As a concentrating agent for phosphatic material, bone-oil treated with a small amount of an alkali.

SIMON KLOSKY.